US009053540B2

(12) United States Patent
Chang et al.

(10) Patent No.: US 9,053,540 B2
(45) Date of Patent: Jun. 9, 2015

(54) STEREO MATCHING BY CENSUS TRANSFORM AND SUPPORT WEIGHT COST AGGREGATION

(75) Inventors: Ji Ho Chang, Yongin (KR); Eul Gyoon Lim, Daejeon (KR); Ho Chul Shin, Daejeon (KR); Jae Il Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 684 days.

(21) Appl. No.: 13/326,794

(22) Filed: Dec. 15, 2011

(65) Prior Publication Data

US 2012/0163704 A1 Jun. 28, 2012

(30) Foreign Application Priority Data

Dec. 23, 2010 (KR) ........................ 10-2010-0134082

(51) Int. Cl.
*G06T 7/00* (2006.01)

(52) U.S. Cl.
CPC ............. *G06T 7/0022* (2013.01); *G06T 7/0075* (2013.01); *G06T 2207/20028* (2013.01)

(58) Field of Classification Search
None
See application file for complete search history.

(56) References Cited

U.S. PATENT DOCUMENTS

2010/0142824 A1* 6/2010 Lu .................................. 382/195
2012/0014590 A1* 1/2012 Martinez-Bauza et al. .. 382/154
2014/0210951 A1* 7/2014 Cho ................................ 348/49
2014/0307047 A1* 10/2014 Kirk et al. ....................... 348/42

FOREIGN PATENT DOCUMENTS

KR 1020020007894 A 1/2002
KR 1020100066914 A 6/2010

OTHER PUBLICATIONS

Yoon et al. (Apr. 2006) "Adaptive support-weight approach for correspondence search." IEEE Trans. on Pattern Analysis and Machine Intelligence. vol. 28 No. 4, pp. 650-656.*
Chang, N. Y-C., et al. (Jun. 2010) "Algorithm and architecture of disparity estimation with mini-census adaptive support weight." IEEE Trans. on Circuits and Systems for Video Technology. vol. 20 No. 6, pp. 792-805.*
Paris, S. (2007) "Fixing the Gaussian blur: the bilateral filter." A Gentle Introduction to Bilateral Filtering and its Applications. Slide presentation, SIGGRAPH 2007.*
Froba et al. (2004) "Face detection with the modified census transform." Proc. 6th IEEE Int'l Conf. on Automatic Face and Gesture Recognition.*
Hong Jeong et al., "Fast Stereo Matching Using Constraints in Discrete Space", IEICE Trans. Inf. & Syst., Jul. 2000, pp. 1592-1600, vol. E83-D, No. 7.

* cited by examiner

*Primary Examiner* — Barry Drennan

(57) ABSTRACT

An image matching apparatus includes a bilateral filter that filters a left image and a right image to output a second left image and a second right image; a census cost calculation unit performing census transform on a window based on a first pixel of the second left image and a window based on a second pixel of the second right image to calculate a census cost corresponding to a pair of pixels of the first and second pixels; a support weight calculation unit obtaining support weights of the left and right images or the second left and second right images; a cost aggregation unit obtaining energy values of nodes corresponding to the pair of pixels of the first and second pixels using the census cost and the support weights; and a dynamic programming unit performing image matching using dynamic programming by the energy values of each node obtained.

16 Claims, 9 Drawing Sheets

FIG.5

| 25 | 88 | 45 |
|----|----|----|
| 120 | 75 | 35 |
| 88 | 62 | 68 |

| 0 | 1 | 0 |
|---|---|---|
| 1 | X | 0 |
| 1 | 0 | 0 |

| 0 | 1 | 0 | 1 | X | 0 | 1 | 0 | 0 |
|---|---|---|---|---|---|---|---|---|

(a)             (b)

(a)              (b)

STEREO MATCHING BY CENSUS TRANSFORM AND SUPPORT WEIGHT COST AGGREGATION

CROSS-REFERENCE TO RELATED APPLICATIONS

This application claims priority to and the benefit of Korean Patent Application NO. 10-2010-0134082 filed in the Korean Intellectual Property Office on Dec. 23, 2010, the entire contents of which are incorporated herein by reference.

TECHNICAL FIELD

The present invention relates to a stereo image matching apparatus and method, and more particularly, to a stereo image matching apparatus and method using a dynamic programming mechanism.

BACKGROUND ART

Stereo image matching technology for obtaining a three-dimensional stereoscopic image is a technology of extracting stereoscopic image information from two images input through cameras mounted left and right. The stereo image matching technology obtains a stereo image by capturing the same subject by using two cameras that are disposed at different positions on the same line. The stereo image matching technology may be considered as a process of calculating a distance up to the subject by detecting which a pattern at a specific position within the image captured by one camera is present at a certain position within the image captured by the other camera and extracting a difference between two positions, that is, disparity.

The stereo image matching technology in a dynamic program type according to the related art replaces the stereo image obtained from the stereo cameras (left camera and right camera) with an image positioned at a central line of both cameras in a row unit so as to obtain the three-dimensional stereoscopic image.

The stereo matching technology according to the related art independently processes each row and does not consider a relationship between upper rows or lower rows at the time of processing each row. Therefore, when calibration of the left and right cameras is accurate, no problem is caused. However, when an epipolar line is distorted due to the inaccuracy of the calibration of the left and right cameras, a steak noise in which a horizontal stripe appears in the image may be caused.

Actually, it is difficult to accurately match the calibration of the left and right cameras and since there is a unique error between the left and right cameras, it is difficult to completely solve the phenomenon.

In addition, since the stereo matching technology according to the related art is designed under the premise that only brightness information in the image information of the left and right cameras is used and the image brightness of the left and right cameras matches each other, the image matching error may be caused when brighter light is incident on the specific camera between the left and right cameras.

SUMMARY OF THE INVENTION

The present invention has been made in an effort to provide an apparatus and a method for matching an image capable of reducing a steak noise, improving sharpness, and obtaining accurate image matching results even when image brightness between left and right cameras is different.

An exemplary embodiment of the present invention provides an image matching apparatus, including: a bilateral filter performing bilateral filtering on a left image and a right image, respectively, to output a second left image and a second right image; a census cost calculation unit performing census transform on a window based on a first pixel of the second left image and a window based on a second pixel of the second right image to calculate a census cost corresponding to a pair of pixels of the first pixel and the second pixel; a support weight calculation unit obtaining support weights of the left image and the right image or the second left image and the second right image; a cost aggregation unit obtaining energy values of nodes corresponding to the pair of pixels of the first pixel and the second pixel using the census cost and the support weights; and a dynamic programming unit performing the image matching using dynamic programming by the energy values of each node obtained.

Another exemplary embodiment of the present invention provides an image matching method, including: performing bilateral filtering on a left image and a right image, respectively, to generate a second left image and a second right image; performing census transform on a window based on a first pixel of the second left image and a window based on a second pixel of the second right image to'calculate a census cost corresponding to a pair of pixels of the first pixel and the second pixel; obtaining support weights of the left image and the right image or the second left image and the second right image; obtaining energy values of nodes corresponding to the pair of pixels of the first pixel and the second pixel using the census cost and the support weights; and performing the image matching using dynamic programming by the energy values of each node obtained.

According to the exemplary embodiments of the present invention, it is possible to reduce the steak noise, improve the sharpness, and obtain the accurate image matching results even when the image brightness between left and right cameras is different.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is a diagram for describing a census transform process.

Figure 1:
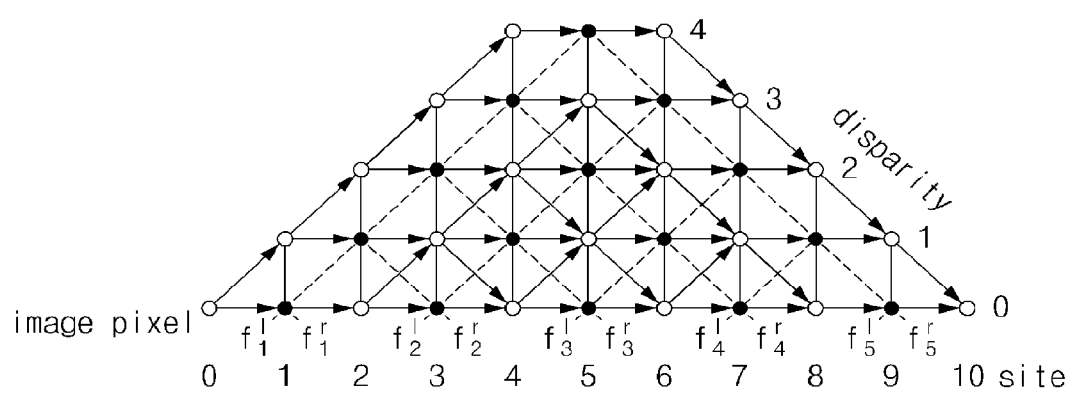
FIG. 1 shows a trellis structure in a dynamic programming type used in an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

First, a dynamic programming type used in an exemplary embodiment of the present invention will be described prior to describing the exemplary embodiments of the present invention.

The dynamic programming type forms a trellis structure as shown in FIG. 1 for input left and right images in a row unit using center-referenced disparity and searches an optimal path to determine the disparity for the row. The trellis structure is configured of match nodes and occlusion nodes. In FIG. 1, the match nodes are shown by a black circle and the occlusion nodes are shown by a white circle. The match nodes correspond to energy representing similarity of a pair of corresponding pixels (a pixel of a left image and a pixel of a right image) and the occlusion nodes search an optimal path by a method of selecting a minimum value among values input from each node.

The dynamic programming type is described in detail in a document [H. Jeong and Y Oh, "Fast stereo Matching using constraints in discrete space," IEICE Trans on Information and Systems, vol. E83-D, no. 7, pp. 1592-6000, 2000] and therefore, a detailed description will be omitted.

Figure 2:
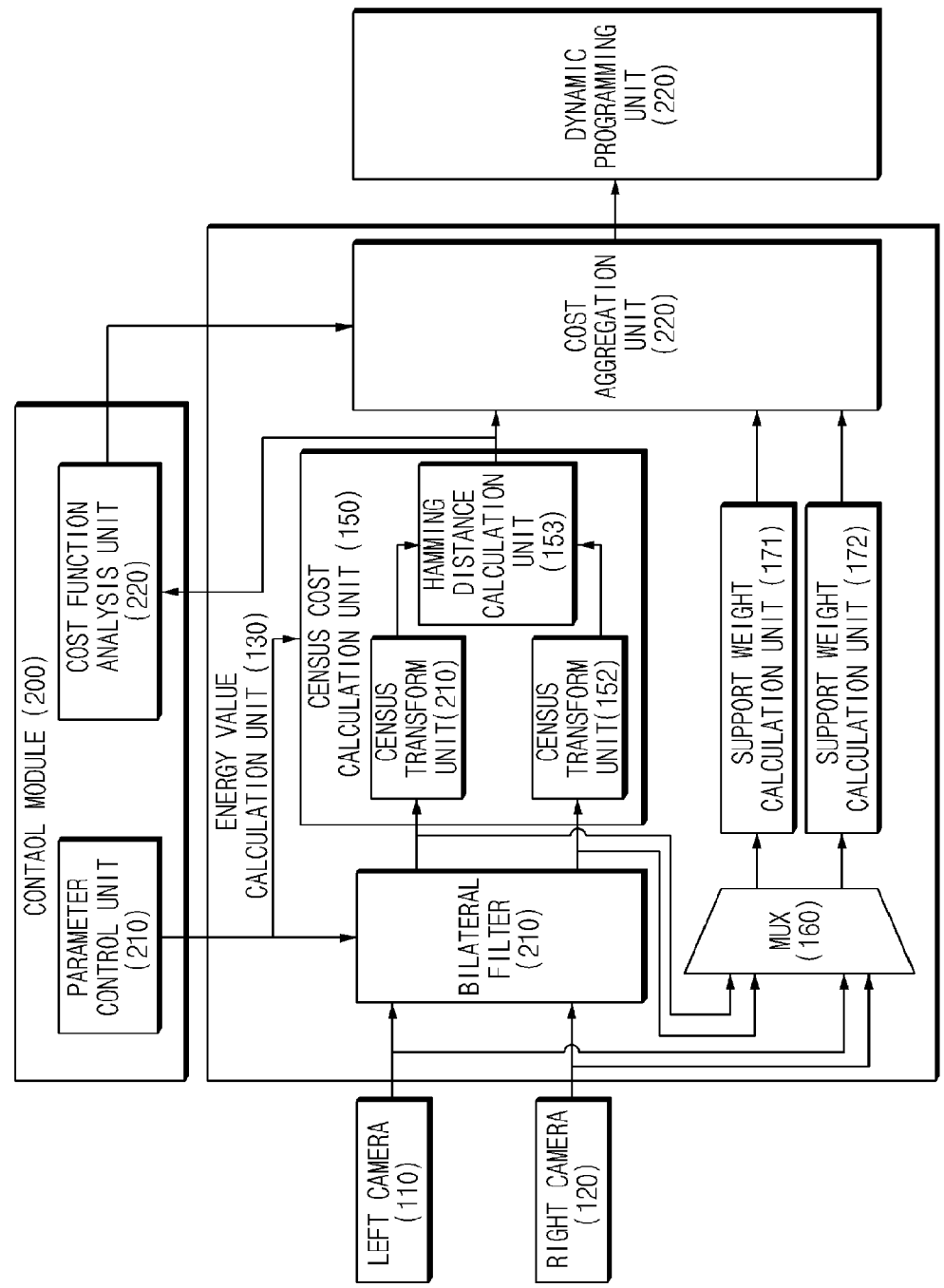
FIG. 2 shows a configuration of an image matching apparatus according to an exemplary embodiment of the present invention.

FIG. 2 shows a configuration of an image matching apparatus according to an exemplary embodiment of the present invention. The image matching apparatus according to the exemplary embodiment of the present invention is configured to include a left camera 110, a right camera 120, an energy value calculation unit 130, a dynamic programming unit 190, and a control module 200.

The energy value calculation unit 130 receives the left image and the right image from the left camera 110 and the right camera 130 and obtains energy values corresponding to each node of the trellis structure for the dynamic programming. The dynamic programming unit 190 performs the image matching using the dynamic programming by the energy values from the energy value calculation unit 130.

That is, the dynamic programming unit 190 forms the trellis structure in a row unit as shown in FIG. 1 and receives the energy values of the matching nodes from the energy value calculation unit 130 to search the optimal path, thereby obtaining the disparity for the corresponding row.

The image matching apparatus according to the exemplary embodiment of the present invention uses a method that uses a census transform for solving a problem due to a difference in brightness of the left and right images to calculate costs between, the pixels of the left and right images and aggregates costs using support weights so as to remove steak noise while securing sharpness. Further, in order to obtain better performance under various environments, the noise of the left and right images input using a bilateral filter is removed.

To this end, the energy value calculation unit 130 of the image matching apparatus is configured to include a bilateral filter 140, a census cost calculation unit 150, a mux 160, support weight calculation units 171 and 172, and a cost aggregation unit 180 as shown.

The bilateral filter 140 performs bilateral filtering on and outputs the left image and the right image input from the left camera 110 and the right camera 120, respectively. Hereinafter, the bilaterally filtered left image and the right image are each referred to as a second left image and a second right image.

The census cost calculation unit 1150 performs census transform (or modified census transform) on a window based on the first pixel of the second left image and a window based on the second pixel of the second right image, respectively, to calculate the census costs corresponding to the pair of pixels of the first pixel and the second pixel.

The support weight calculation units 171 and 172 obtains the support weights for each pixel of the left image and the right image input from the left camera 110 and the right camera 120 or the support weights for each pixel of the second left image and the second right image.

The mux 160 determines whether the support weight calculation units 171 and 172 use the left image and the right image as the input and use the second left image and the second right image as the input. That is, the mux 160 transfers the left image and the second image to the support weight calculation units 171 and 172 according to the user's setting or transfers the second left image and the second right image to the support weight calculation units 171 and 172.

The cost aggregation unit 180 aggregates the census cost and each support weight of the left image and the right image in the window unit corresponding to the first pixel and the second pixel to obtain the energy values of the nodes corresponding to the first pixel and the second pixel.

The control module 200 controls parameters of the bilateral filter 140 and the census cost calculation unit 150 and analyzes the census cost of the census cost calculation unit 150 to control the output from the cost aggregation unit 180. In detail, the control module 200 is configured to include a parameter control unit 210 and a cost function analysis unit 220. The parameter control unit 210 and the cost function analysis unit 220 will be described below.

Hereinafter, a detailed operation of the bilateral filter 140 will be described with reference to FIGS. 3A and 3B. General smoothing filters (for example, Gaussian filter) consider only a spatial distance between a central pixel and a peripheral pixel. Therefore, there is a problem in that a boundary portion between objects blurs due to a loss of edge information. On the other hand, the bilateral filter is a non-linear filter that preserves an edge in consideration of both spatial proximity and luminous similarity for peripheral pixels. Therefore, the bilateral filter may emphasis a boundary line while performing noise removal. Further, the filtering strength of the bilateral filter can be easily changed by controlling weights imparted to each pixel.

Figure 3A:
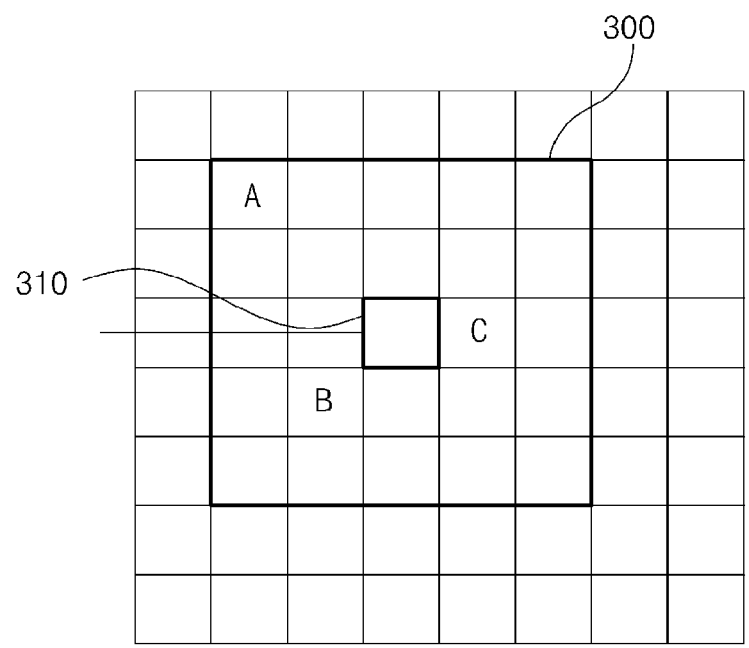
FIGS. 3A and 3B are diagrams for explaining a detailed operation of a bilateral filter 140.

FIG. 3A is a diagram showing weights according to a spatial distance of the bilateral filter 140. In FIG. 3A, a size of a window 300 is set to be 5×5, but the size of the window 300 may be set to be any different size. The bilateral filter 140 applies a lower weight to the peripheral pixels of the targeted pixel, that is, pixels within the window 300 based on the targeted pixels as the distance of the targeted pixel is long. As an example of pixels A, B, and C, the lowest weight is applied to pixel A in which a distance from a targeted pixel 310 is the longest and the highest weight is applied to pixel C in which a distance from the targeted pixel 310 is the shortest. As such, when only the weight according to the spatial distance is applied, an effect that the images are wholly softened and slightly distorted is obtained. The bilateral filter applies the weights according to the pixel values of the targeted pixel and the peripheral pixel together with the weights according to the spatial distance, thereby obtaining an effect of emphasizing the boundary line while removing the noise.

Figure 3B:
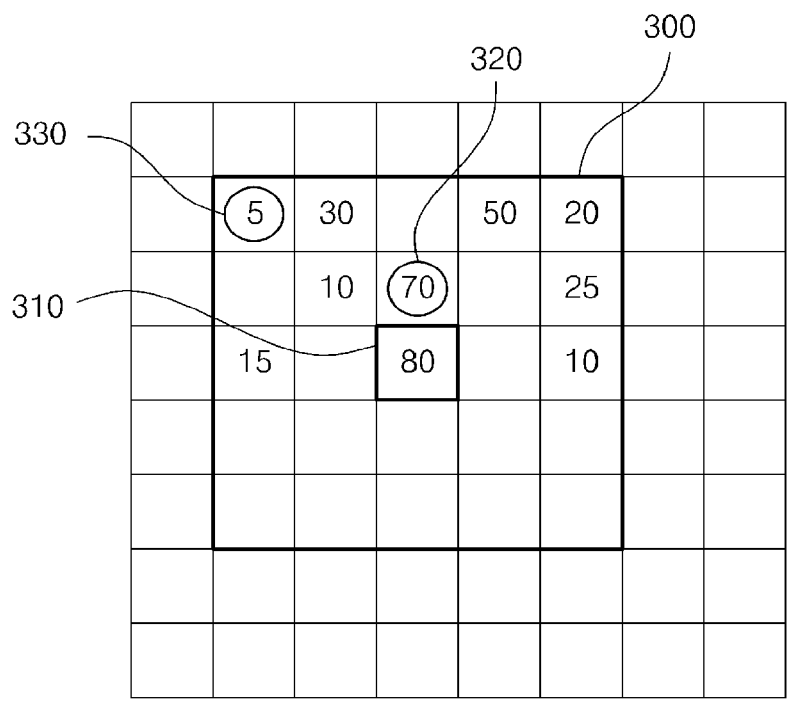

FIG. 3B shows the weights according to the pixel values of the targeted pixel and the peripheral pixel of the bilateral filter 140. The bilateral filter 140 applies the higher weight to the pixels within the window 300 as the difference between the pixel values for the targeted pixels is smaller and applies the lower weight as the difference between the pixel values is larger. For example, when the pixel value of the targeted pixel 310 is 80, the highest weight is applied to the most similar pixel 320 as a pixel value of 70 and the lowest weight is applied to a pixel 330 in which a difference in the pixel value as a pixel value of 5 is the largest.

In the specification, the weight according to the spatial distance is referred to as a radial domain weight (RDW) and the weight according to the pixel value is referred to as an intensity range weight (IRW). In this case, the RDW value is determined according a sigma_d value and the IRW value is determined according to a sigma_r value. The size of the window, that is, the range of the peripheral pixel is determined according to the value. For example, 20.0 as the sigma_d value and 3.0 as the sigma_r value may be applied. In this case, a pixel spaced apart from the targeted pixel by 16 pixels or more has the IRW value that has a value of 0 up to three places of decimal Therefore, the size of the window may be determined as 16×16 (256 pixels). When the RDW value and the IRW value are determined, a new pixel value (newPixel) of the targeted pixel may be determined according to the following Equation.

$$num = \sum_{i=0}^{255} Pixel_i * IRW_i * RDW_i$$

$$denom = \sum_{i=0}^{255} IRW_i * RDW_i$$

$$newPixel = \begin{cases} \dfrac{num}{denom} & (denom \neq 0) \\ Pixel_{i36} & (denom = 0) \end{cases}$$

[Equation 1]

Here, Pixeli represents the pixel value of an i-th pixel within the window.

A parameter control unit 210 of the control module 200 controls parameters of the bilateral filter 140. For example, the parameter control unit 210 controls the sigma_d value and the sigma_r value. The parameter control unit 210 may receive the sigma_d value and the sigma_r value from a user.

Referring again to FIG. 2, the census cost calculation unit 150 is configured to include census transform units 151 and 152 and a hamming distance calculation unit 153. When the census cost calculation unit 150 performs modified census transform, the census transform units 151 and 152 may be replaced with the modified census transform unit. According to the exemplary embodiment, the census transform units 151 and 152 may selectively perform the census transform and the modified census transform according to the user selection or the predetermined reference. The parameter control unit 210 of the control module 200 determines the parameters on whether the census transform units 151 and 152 perform any one of the census transform and the modified census transform.

The census transform unit 151 uses a central pixel value of the window based on the first pixel of the second left image as a representative value to obtain a value according to a large and small size of each pixel value within the window for the representative value. The census transform unit 152 uses the central pixel value of the window based on the first pixel of the second right image as a representative value to obtain a value according to a large and small size of each pixel value within the window for the representative value. The hamming distance calculation unit 153 obtains a hamming distance of the census transform result of the window based on the first pixel and the census transform result of the window based on the second pixel so as to calculate the obtained hamming distance as the census costs corresponding to the first pixel and the second pixel.

In the case of the census transform, the central pixel value of the window is the representative value as described above, but in the case of the modified census transform, an average of the pixel values within the window is the representative value.

Figure 4:
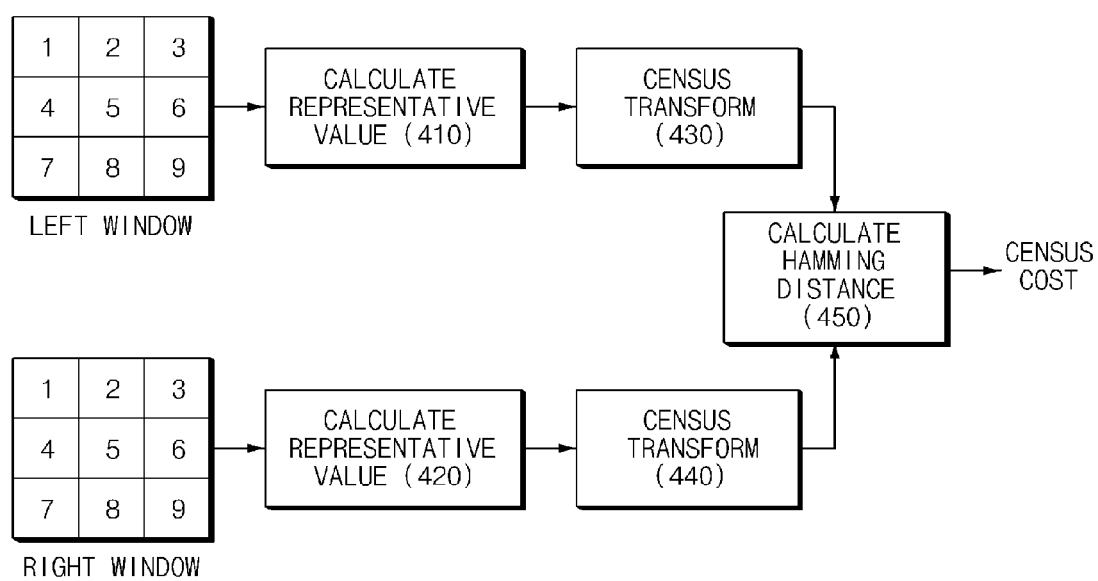
FIG. 4 is a diagram for describing in detail an operation of a census transform unit 151.

FIG. 4 is a diagram for describing in detail an operation of a census transformer 151. The size of the left window and the right window input is described as, for example, 3×3. The size of the window may be set to be any different size. At step 410, the representative value of the left window is calculated and at step 420, the representative value of the right window is calculated. In the case of the census transform, the pixel value of the central pixel 5 is output as the representative value and in the case of the modified census transform, the average of the pixel values within the window is output as the representative value. At step 430, the census transform is performed on the left window based on the representative value and at step 440, the census transform is performed on the right window based on the representative value. The census transform 430 and 440 obtains the value (for example, 1 or 0) according to the large and small size of each pixel value for the representative value by comparing each pixel value within the window with the representative value and transforms and outputs the value into the bit pattern.

FIG. 5 is a diagram for describing a census transformation process. Referring to FIG. 5, a pixel value 75 of the central pixel is defined as a representative value, 1 or 0 is determined according to the large and small size of each pixel value for 75, and a result of transforming it into the bit pattern is shown.

Next, at step 450, the hamming distance of the census transform result of the left window and the census transform result of the right window is calculated. That is, the hamming distance is calculated by comparing the bit pattern of the census transform result for the left window and the bit pattern of the census transform result for the right window for each bit.

Hereinafter, the support weight calculation units 171 and 172 will be described in detail. The support weight method is a method of differently setting the weight according to the similarity and the distance of the pixel value for the central pixel within the window (support window) having a predetermined size. That is, the support weight method is a method of setting the weight (support weight) to be high as the distance from the central pixel approaches and a method of setting the weight (support weight) to be high as the pixel value for the central pixel is similar. The weight w (p and q) of the pixel q for the central pixel p may be represented as follows.

$$w = (pq) = f(\Delta c_{pq}, \Delta g_{pq})$$

Herein, $\Delta c_{pq}$ and $\Delta g_{pq}$ each represents a difference between the pixel values of the pixel p and the pixel q and the spatial distance. $\Delta c_{pq}$ and $\Delta g_{pq}$ may be considered as an independent event and may thus be separately calculated. Therefore, $f(\Delta c_{pq}, \Delta g_{pq})$ may be represented again as follows.

$$f(\Delta c_{pq}, \Delta g_{pq}) = f_s(\Delta c_{pq}) \cdot f_p(\Delta g_{pq})$$

For example, $f_s(\Delta c_{pq})$ and $f_p(\Delta g_{pq})$ may be calculated according to the following equation.

$$f_s(\Delta c_{pq}) = \exp\left(-\frac{\Delta c_{pq}}{\gamma_c}\right)$$

$$f_p(\Delta g_{pq}) = \exp\left(-\frac{\Delta g_{pq}}{\gamma_p}\right)$$

Herein, $\gamma_c$ is a value for determining a strength of grouping due to similarity, and $\gamma_p$ is a value for determining a strength of grouping due to proximity, which may be previously selected as a proper value. In addition, $\gamma_p$ may be determined according to the size of the support window.

Therefore, the weight of the pixel q for the pixel p may be represented as follows.

$$w(p, q) = \exp\left(-\left(\frac{\Delta c_{pq}}{\gamma_c} + \frac{\Delta g_{pq}}{\gamma_p}\right)\right)$$

Figure 6:
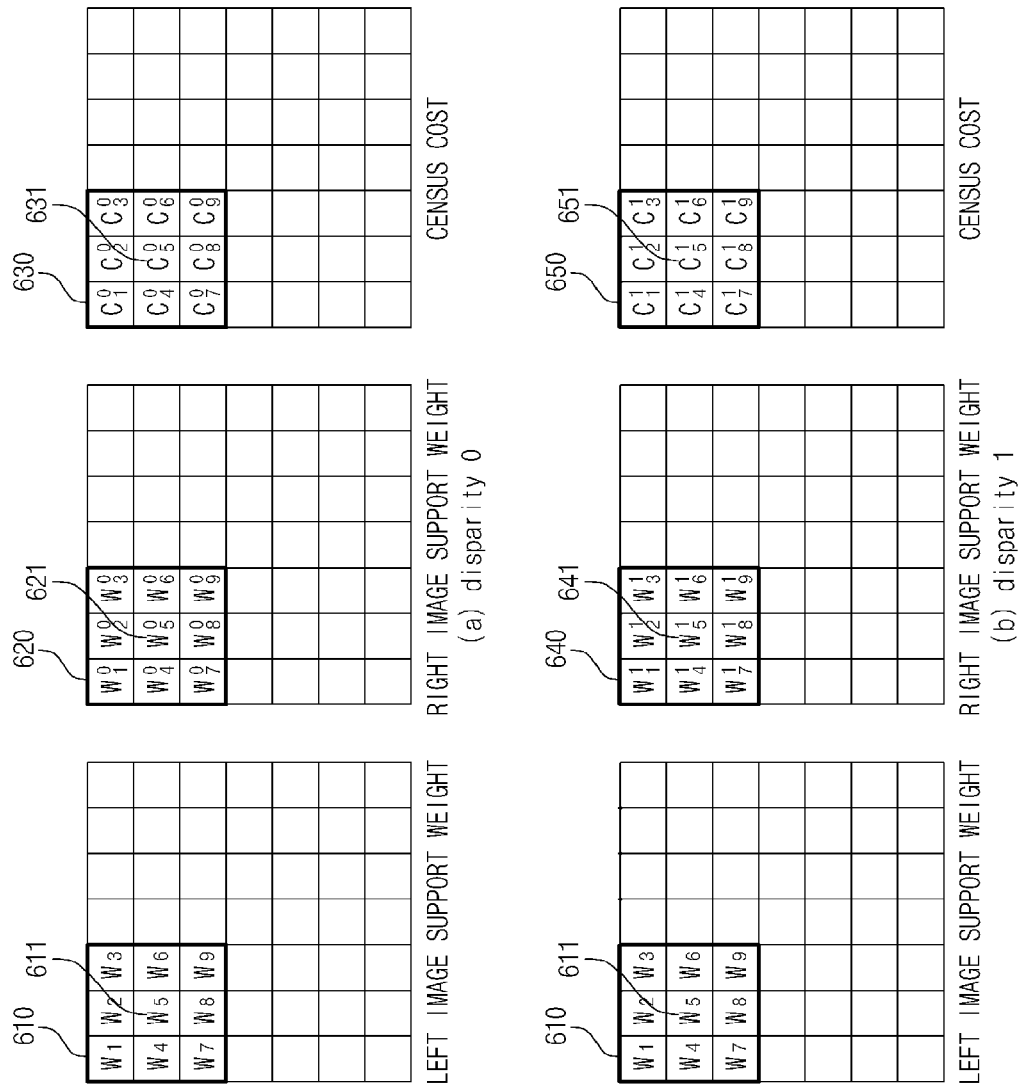
FIG. 6 is a diagram for describing in detail an operation of a cost aggregation unit 180.

FIG. 6 is a diagram for describing in detail an operation of a cost aggregation unit 180. The cost aggregation unit 180 uses the support weights of each pixel within the first window based on the first pixel of the left image, the support weights of each pixel within the second window based on the second pixel of the right image, and the census costs within the third window based on the census cost corresponding to the pair of pixels of the first pixel and the second pixel to obtain the energy values of the nodes corresponding to the pair of pixels of the first pixel and the second pixel In detail, the cost aggregation unit 180 obtains a sum of the support weights of each pixel within the first window, the support weights of each corresponding pixel within the second window, and a product of each corresponding census cost within the third window as the energy values of the corresponding nodes.

FIG. 6 shows a case in which the support window is 3×3. FIG. 6A shows a support weight ($w_1 \sim w_Q$) of each pixel within a first window 610 based on a first pixel 611 of the left image, a support weight ($w_1^0 \sim w_Q^0$) of each pixel within a second window 620 based on a second pixel 621 in which the disparity in the right image based on the first pixel 611 is 0, and a census cost ($c_1^0 \sim c_Q^0$) within a third window 630 based on a census cost 631 corresponding to the first pixel 611 and the second pixel 621. The energy values of the nodes corresponding to the pair of pixels of the first pixel 611 and the second pixel 621 may be represented by the following equation.

$$\sum_{i=1}^{9} w_i \cdot w_i^0 \cdot c_i^0 \qquad \text{[Equation 2]}$$

FIG. 6B shows a support weight ($w_1 \sim w_Q$) of each pixel within a first window 610 based on a first pixel 611 of the left image, a support weight ($w_1^1 \sim w_Q^1$) of each pixel within a second window 640 based on a second pixel 641 in which the disparity in the right image based on the first pixel 611 is 1, and a census cost ($c_1^1 \sim c_Q^1$) within a third window 650 based on a census cost 651 corresponding to the first pixel 611 and the second pixel 641. The energy values of the nodes corresponding to the pair of pixels of the first pixel 611 and the second pixel 641 may be represented by the following equation.

$$\sum_{i=1}^{9} w_i \cdot w_i^1 \cdot w_i^1 \qquad \text{[Equation 3]}$$

The cost aggregation unit 180 calculates the energy values of the nodes corresponding to the pair of each pixel by a predetermined maximum disparity level (for example, 28=64) for each row of the left image and the right image by the above-mentioned method The maximum disparity level may be changed according to applications.

Figure 7:
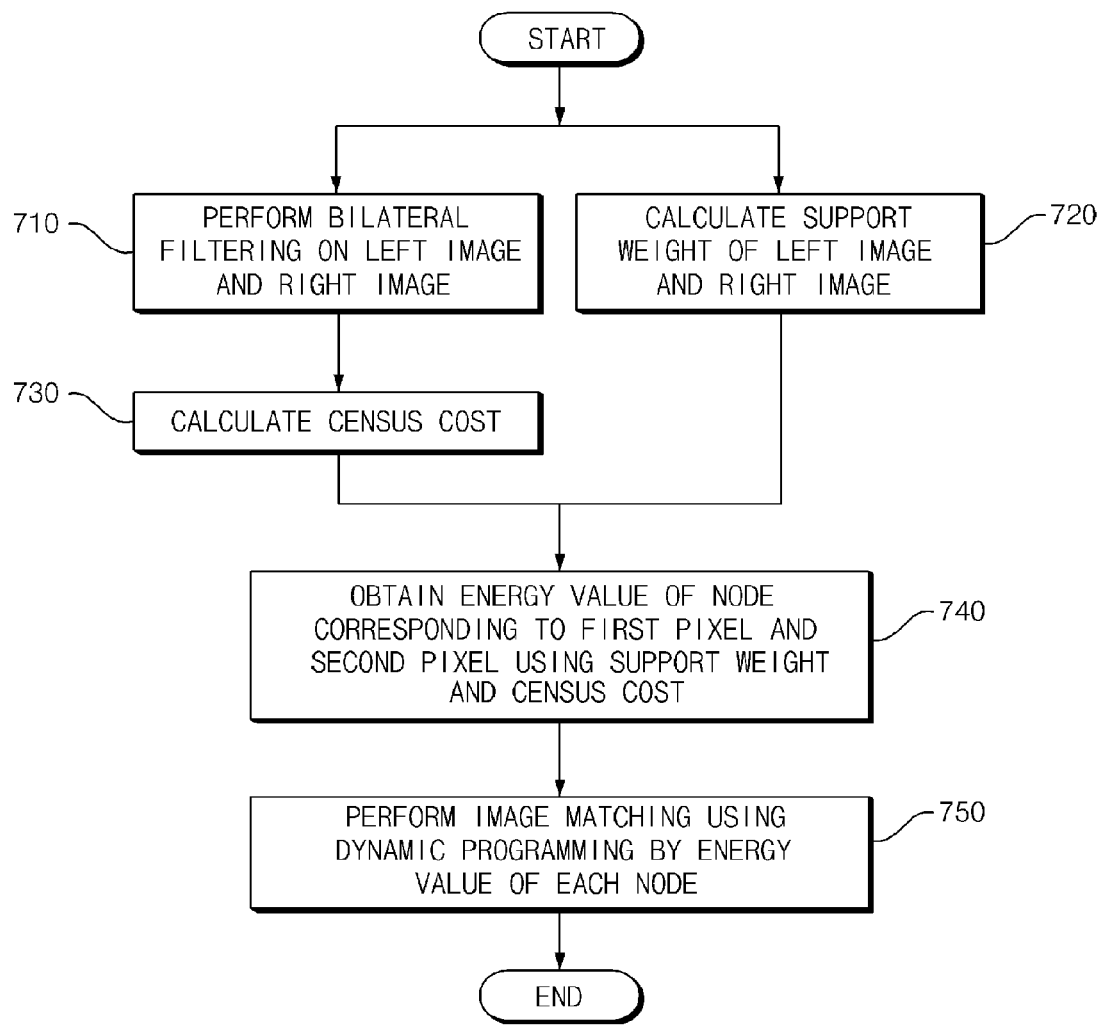
FIG. 7 shows a flow chart of an image matching method according to an exemplary embodiment of the present invention.

The cost function analysis unit 220 analyzes the census cost of the census cost calculation unit 150 to control the output from the cost aggregation unit 180. In detail, the cost function analysis unit 220 controls the cost aggregation unit 180 to output a predetermined minimum value as the energy value when the census cost of the census cost calculation unit 150 is a threshold or less or the energy values output from the cost aggregation unit 180 is a threshold or less. In this case, the threshold of the census cost, the threshold of the output energy value, and the minimum value of the output energy value may be previously set by being input from the outside. In the case of over exposure or under exposure, the energy value transferred to a dynamic programming unit 190 may have a value abnormally approaching 0, which may be effectively removed by the above-mentioned operation of the cost function analysis unit 220. FIG. 7 shows a flow chart of the image matching method according to the exemplary embodiment of the present invention. The image matching method according to the exemplary embodiment of the present invention is configured to include steps processed in the image matching apparatus described above. Therefore, even in the case of contents omitted below, the contents described above with reference to the image matching apparatus may also be applied to the image matching method according to the exemplary embodiment of the present invention.

At step 710, the bilateral filter 140 performs bilateral filtering on the left image and the right image, respectively, to generate the second left image and the second right image.

At step 720, the support weight calculation units 171 and 172 calculate the support weight for each pixel of the left image and the right image. However, at step 720, the support weight calculation units 171 and 172 may also calculate the support weights for each pixel of the second left image and the second right image, instead of the left image and the right image.

At step 730 after step 710, the census cost calculation unit 150 performs census transformation (or modified census transformation) on a window based on the first pixel of the second left image and a window based on the second pixel of the second right image, respectively, to calculate the census costs corresponding to the pair of pixels of the first pixel and the second pixel.

Next, at step 740, the cost aggregation unit 180 obtains the energy values of the nodes corresponding to the first pixel and the second pixel using the support weight and the census cost of the left image and the right image, respectively.

Next, at step 750, the dynamic programming unit 190 performs the image matching using the dynamic programming, with the energy value of each node.

Figure 8:
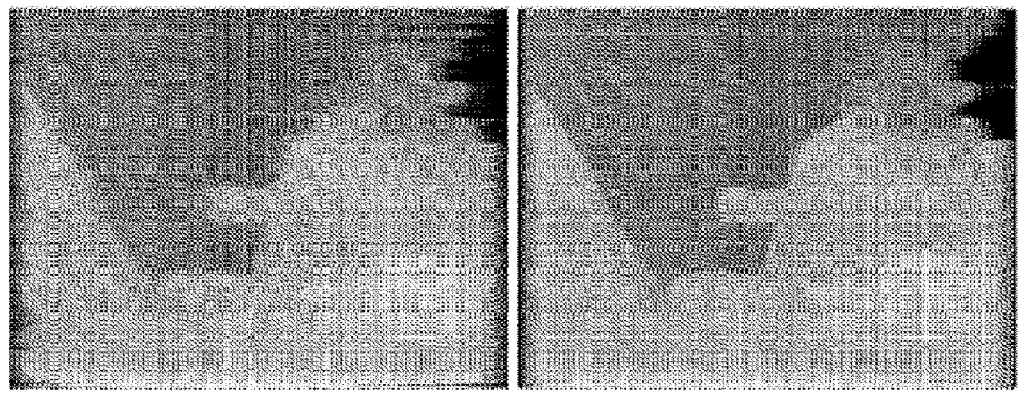
FIG. 8 shows image matching results according to the existing dynamic programming mechanism and image matching results according to an exemplary embodiment of the present invention.

FIG. 8 shows an image matching result (a) according to the existing dynamic programming mechanism and an image matching result (b) according to an exemplary embodiment of the present invention when the left and right cameras are accurately calibrated. It can be appreciated from FIG. 8 that the steak noise and the block phenomenon are more remarkably reduced in (b) as compared to (a).

Figure 9:
FIG. 9 shows image matching results according to the existing dynamic programming mechanism and image matching results according to an exemplary embodiment of the present invention when brightness of light input to left and right cameras is different.

FIG. 9A shows the image matching result in which errors occur due to the difference in the brightness of light input to the left and right cameras. It can be appreciated from FIG. 9B that the better image matching results as the image matching results according to the exemplary embodiment of the present invention under the same environment are obtained.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An image matching method, comprising:
generating a filtered left image and a filtered right image by performing bilateral filtering on a left image and a right image;
calculating a census cost corresponding to pixels from the filtered images by performing a census transform on a window based on a pixel of the filtered left image and a window based on a pixel of the filtered right image;
determining support weights of the left image and the right image;
obtaining a product of the calculated census costs and a sum of the determined support weights as energy values for match nodes of a trellis structure used in dynamic programming for image matching, the match nodes corresponding to the pixel of the filtered left image and the pixel of the filtered right image;
adjusting the obtained energy values based on the calculated census cost; and
performing image matching using dynamic programming with the obtained energy values.

2. The method of claim 1, wherein generating the filtered left image and the filtered right image includes transforming a pixel value of a targeted pixel into a sum of weights of pixel values of the targeted pixel and peripheral pixels of the targeted pixel.

3. The method of claim 2, wherein the peripheral pixel is a pixel within the window based on the targeted pixel.

4. The method of claim 3, wherein the weight corresponding to the peripheral pixel is determined according to a distance from the targeted pixel and a difference in the pixel values of the targeted pixel.

5. The method of claim 1, wherein calculating the census costs includes:
determining a central pixel value of the window based on the pixel of the filtered left image;
determining a central pixel value of the window based on the pixel of the filtered right image; and
obtaining a hamming distance based on the determined central pixel values.

6. The method of claim 1, wherein calculating the census costs includes:
determining an average of pixel values within the window based on the pixel of the filtered left image;
determining an average of pixel values within the window based on the pixel of the filtered right image; and
obtaining a hamming distance based on the determined averages of the pixel values.

7. The method of claim 1, wherein determining the support weights includes setting different weights as the support weight according to a distance from a central pixel and similarity of pixel values for each pixel within a window having a predetermined size.

8. The method of claim 1, wherein adjusting the energy values based on the calculated census cost includes adjusting the obtained energy values to predetermined energy values when the calculated census cost is lower than a first threshold value or the obtained energy values are lower than a second threshold value.

9. A non-transitory computer-readable storage medium whose contents, when executed by a computing system, cause the computing system to perform operations of image matching, the operations comprising:

generating a filtered left image and a filtered right image by performing bilateral filtering on a left image and a right image;

calculating a census cost corresponding to pixels from the filtered images by performing a census transform on a window based on a pixel of the filtered left image and a window based on a pixel of the filtered right image;

determining support weights of the left image and the right image;

obtaining a product of the calculated census costs and a sum of the determined support weights as energy values for match nodes of a trellis structure used in dynamic programming for image matching, the match nodes corresponding to the pixel of the filtered left image and the pixel of the filtered right image;

adjusting the obtained energy values based on the calculated census cost; and performing image matching using dynamic programming with the obtained energy values.

10. The computer-readable storage medium of claim 9, wherein adjusting the energy values based on the calculated census cost includes adjusting the obtained energy values to predetermined energy values when the calculated census cost is lower than a first threshold value or the obtained energy values are lower than a second threshold value.

11. The computer-readable storage medium of claim 9, wherein generating the filtered left image and the filtered right image includes transforming a pixel value of a targeted pixel into a sum of weights of pixel values of the targeted pixel and peripheral pixels of the targeted pixel.

12. The computer-readable storage medium of claim 11, wherein the peripheral pixel is a pixel within the window based on the targeted pixel.

13. The computer-readable storage medium of claim 12, wherein the weight corresponding to the peripheral pixel is determined according to a distance from the targeted pixel and a difference in the pixel values of the targeted pixel.

14. The computer-readable storage medium of claim 9, wherein calculating the census costs includes:

determining a central pixel value of the window based on the pixel of the filtered left image;

determining a central pixel value of the window based on the pixel of the filtered right image; and obtaining a hamming distance based on the determined central pixel values.

15. The computer-readable storage medium of claim 9, wherein calculating the census costs includes:

determining an average of pixel values within the window based on the pixel of the filtered left image;

determining an average of pixel values within the window based on the pixel of the filtered right image; and obtaining a hamming distance based on the determined averages of the pixel values.

16. The computer-readable storage medium of claim 9, wherein the support weights includes setting different weights as the support weight according to a distance from a central pixel and similarity of pixel values for each pixel within a window having a predetermined size.

* * * * *